April 22, 1952 A. A. MARKSON 2,593,906
FORCE MEASURING DEVICE OF THE DIAPHRAGM TYPE PROVIDED
WITH A VALVE FOR AUTOMATICALLY APPLYING A BALANCING
PRESSURE TO THE DIAPHRAGM
Filed June 10, 1947 2 SHEETS—SHEET 1

INVENTOR:
Alfred A. Markson
BY
His ATTORNEY

April 22, 1952 A. A. MARKSON 2,593,906
FORCE MEASURING DEVICE OF THE DIAPHRAGM TYPE PROVIDED
WITH A VALVE FOR AUTOMATICALLY APPLYING A BALANCING
PRESSURE TO THE DIAPHRAGM
Filed June 10, 1947 2 SHEETS—SHEET 2
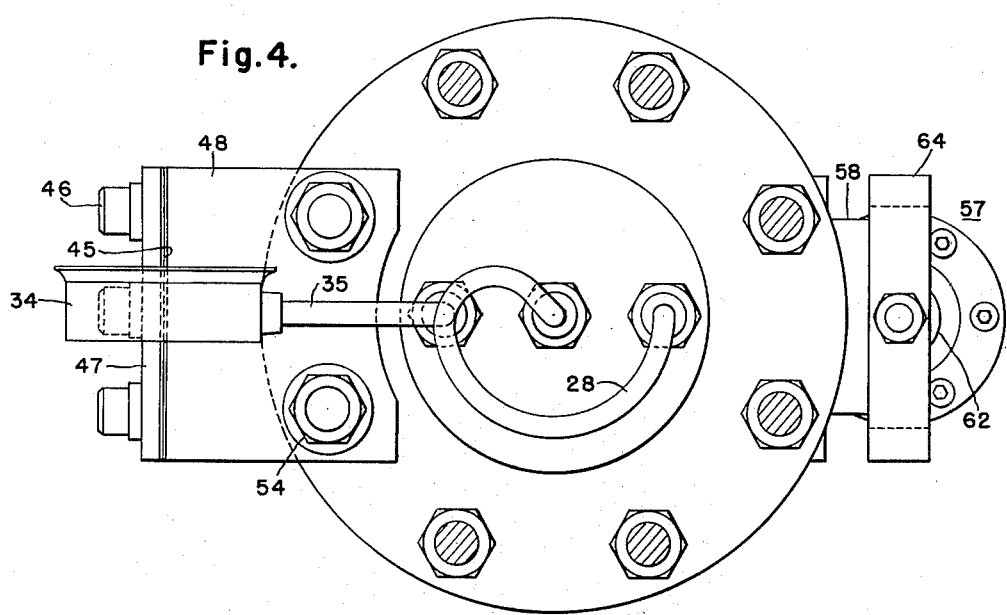
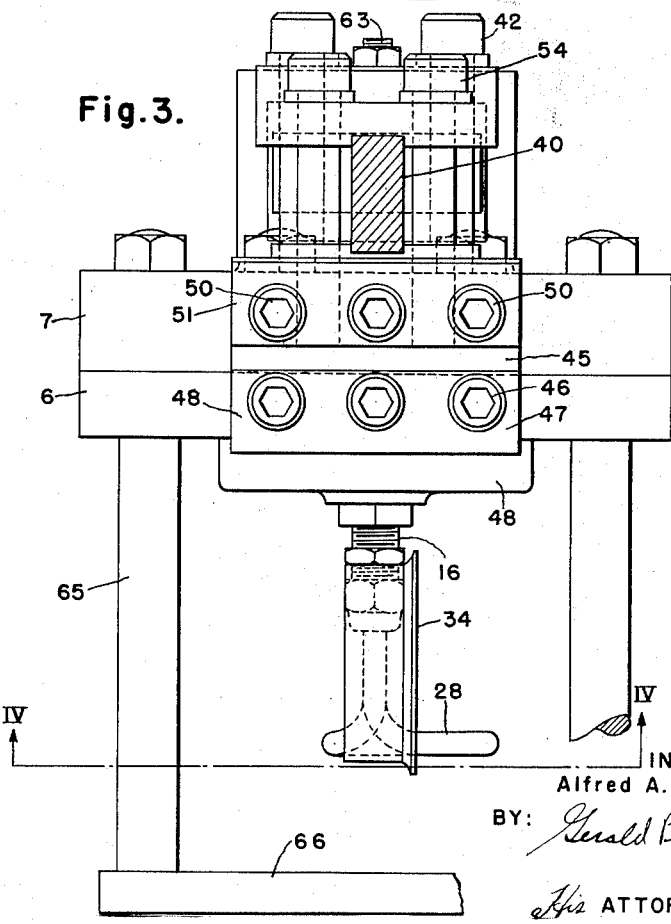
INVENTOR
Alfred A. Markson
BY:
His ATTORNEY Patented Apr. 22, 1952

2,593,906

UNITED STATES PATENT OFFICE 2,593,906

FORCE MEASURING DEVICE OF THE DIAPHRAGM TYPE PROVIDED WITH A VALVE FOR AUTOMATICALLY APPLYING A BALANCING PRESSURE TO THE DIAPHRAGM

Alfred A. Markson, Mount Lebanon, Pa., assignor, by mesne assignments, to Hagan Corporation, Pittsburgh, Pa., a corporation of Pennsylvania Application June 10, 1947, Serial No. 753,749

1 Claim. (Cl. 137—153)

This invention relates to force measuring devices and more particularly to devices having diaphragms and means for maintaining a pressure on the diaphragms of such value that the forces applied to them are balanced by the forces of the pressures acting on the diaphragms.

Force or thrust measuring devices of the type above referred to are unique in that they are extremely accurate and, by means of a suitably calibrated pressure gauge, the applied force may be determined directly from the gauge reading.

Devices of this type are employed for measuring the torque of dynamometers, the thrust of jet engines and other forces. These devices ordinarily are equipped with diaphragms having, as nearly as can be, constant effective areas. It is known, however, that it is difficult to produce diaphragms in quantity having identical effective areas even though preformed in a mold or die having precise dimensions. For this reason, one device will not necessarily give the same force reading as that recorded by another device having a diaphragm whose effective area is theoretically equal, even though the force applied to one is precisely equal to that applied to the other.

An object of this invention is to provide a force measuring device of the diaphragm type having a fulcrum through which the force is transmitted by a thrust arm to the diaphragm and means whereby the fulcrum may be adjusted so that the force recorded by the pressure gauge, for example, will correspond in value with the actual force to be measured and which is acting on the thrust bar.

Other objects of the invention will, in part, be apparent, and will, in part, be obvious from the following description taken in conjunction with the accompanying drawings in which:

Fig. 3 is a view in elevation of the device shown in Figs. 1 and 2 as seen looking in the direction of arrow III in Fig. 2; and Fig. 4 is a view in section taken on line IV—IV of Fig. 3.

Throughout the drawings and the specification, like reference characters indicate like parts.

Figure 1:
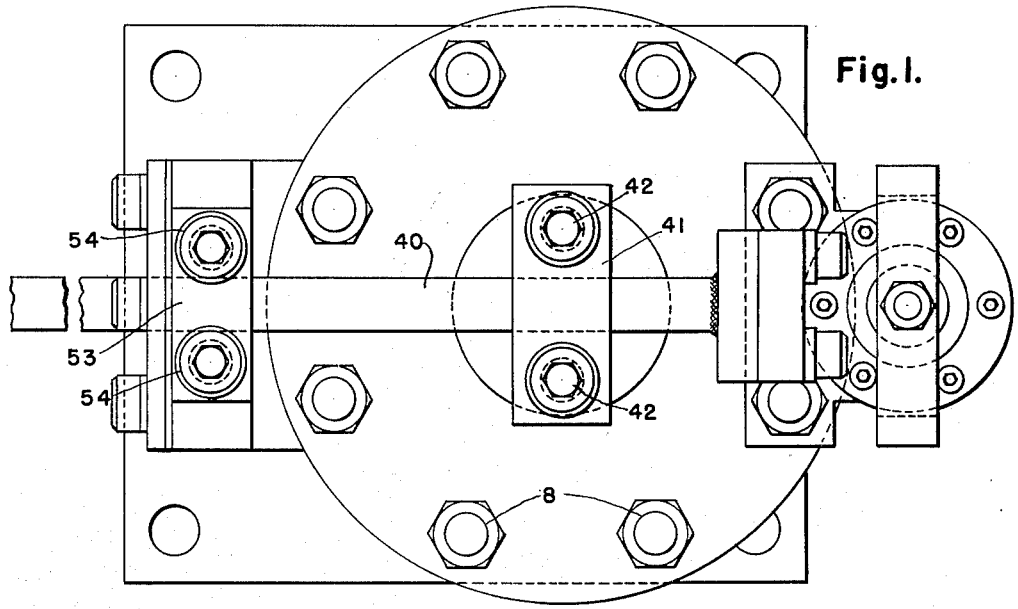
Figure 1 is a top plan view of a force measuring device embodying the invention.
Figure 2:
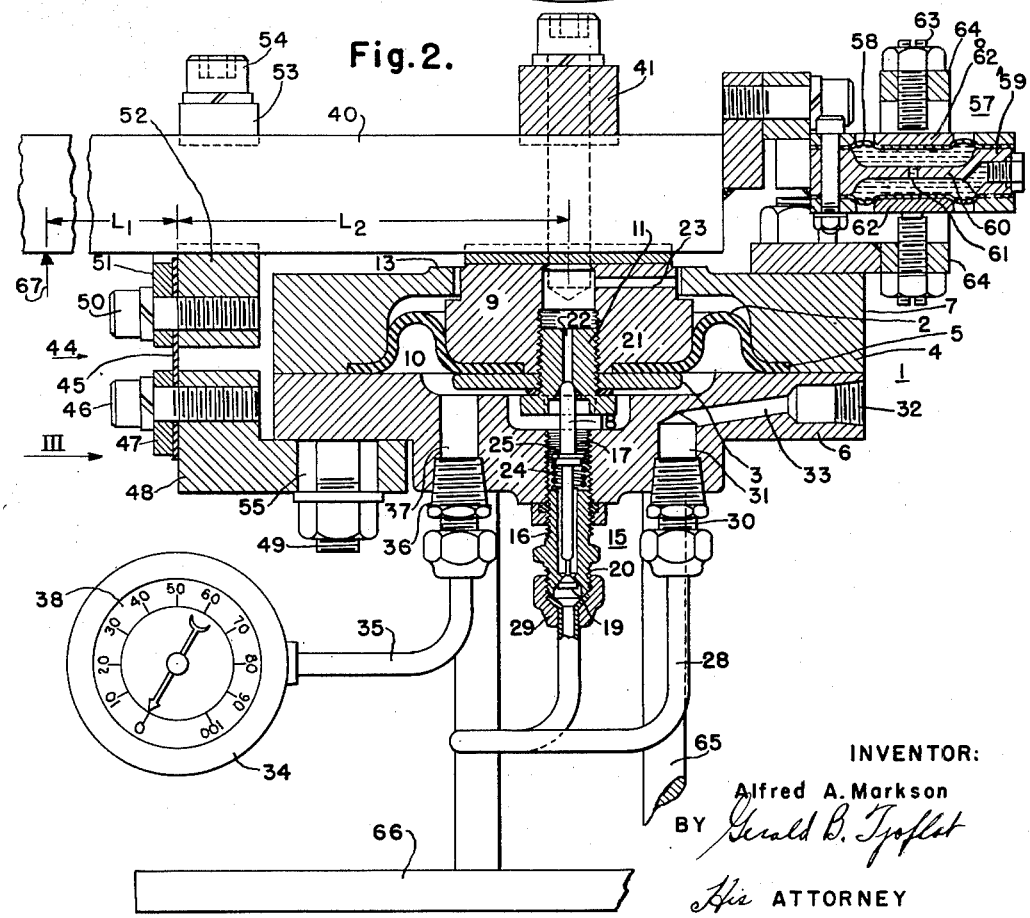
Fig. 2 is a view in section taken on line II—II of Fig. 1.

As shown in the drawings, the thrust or force measuring device 1 is provided with a diaphragm 2. Diaphragm 2 may be made of rubber, either synthetic or natural, and reinforced if desired with suitable reinforcing fabric. It is preferred that this diaphragm be a molded preformed diaphragm so that its shape and dimensions will be in accordance with predetermined design and values. The diaphragm has a central flat portion 3, a flat edge portion 4 and an intermediate slack portion 5 of substantially U-shape in section.

The marginal edge 4 of the diaphragm is clamped between a housing 6 and a clamp ring 7, the ring and housing being bolted tightly together by means of bolts 8. The central flat portion of the diaphragm is clamped between a bearing member or thrust plate 9 and a clamping plate 10 by means of a bolt 11 that is threaded through the plate 10 and into the thrust plate 9. Ring 7 as shown is formed with an inwardly projecting annular flange 13 provided with an opening through which the thrust plate 9 extends. Flange 13 acts both as a cover for one face of the diaphragm and as a guide for the thrust member 9.

The pressure which is applied to diaphragm 2 is introduced into the space formed between the housing 6 and the diaphragm by means of a valve 15. Valve 15 comprises a body 16 that is threaded into a tapped opening 17 in the diaphragm housing 6 and a valve stem 18 disposed within the valve body. One end of the valve stem is formed with a valve 19 which controls inlet port 20 of the valve and the other end of the stem is disposed to seat in an exhaust valve port 21 formed in bolt 11.

Bolt 11 is provided with a longitudinal passage 22 that communicates with a passage 23 in the thrust plate 9 and provides communication between the chamber formed by diaphragm 2 and housing 6, and the atmosphere. The valve stem is urged in a direction to cause valve 19 to seat on the inlet port 20 by means of a light compression spring 24 mounted between the inner end of the valve body 16 and a support flange 25 carried by the valve stem. The pressure medium applied to the diaphragm may be compressed air for example. This would be supplied to the inlet of the valve at a constant pressure. For convenience, the pressure supply may be connected to the valve by means of a pipe 28. One end of pipe 28 is connected to the inlet of the valve body by means of a coupling 29, and the other end is connected to a fitting 30 which is screwed into a tapped hole 31 in the diaphragm housing 6. Another tapped hole 32 is provided in the edge of the diaphragm housing, a passageway 33 providing communication between holes 31 and 32. The pressure supply (not shown) is connected to the tapped hole 32.

As will be apparent from the description of the device herein given, the pressure maintained on diaphragm 2 by valve 15 is a function of the force applied to it. Therefore, this force may be measured directly by employing a pressure gauge 34 connected, as shown, to register the pressure between diaphragm 2 and housing 6. By suitably calibrating scale 33 in terms of pounds, for example, the particular pressure prevailing and acting on the diaphragm at any moment may be read as pound feet rather than as pounds per square inch gauge.

The force to be measured by device 1 is applied to diaphragm 2 by means of a thrust bar 40, one end of which is clamped to thrust plate 9 by means of a clamp block 41 and bolts 42. Bar 40 is secured to a fulcrum 44 comprising a flexible strip 45 of steel or other suitable material. One end of strip 45 is secured by means of bolts 46 and a clamp block 47 to an L-shaped bracket 48 which is adjustably secured by means of a bolt 49 to the diaphragm housing 6. The upper end of strip 45 is secured by bolts 50 and a clamping plate 51 to a fulcrum block 52. Thrust bar 40 is clamped between block 52 and block 53 with bolts 54 disposed one on each side of the thrust bar 40. These bolts are threaded into the fulcrum block 52. By loosening these bolts, the point at which the fulcrum acts on bar 40 may be shifted lengthwise thereof.

The L-shaped bracket 48 is provided with an elongated hole 55 through which bolt 49 extends to permit adjustment of the fulcrum towards or away from the center of thrust plate 9. By means of this adjustment and the adjustment provided by bolts 54 as referred to above, the lengths of lever arms L-1 and L-2 may be adjusted as required.

In order that vibration of the diaphragm may be prevented, a vibration damping device 57 is provided. This device includes a pair of diaphragms 58 clamped on opposite sides of a ring like member 59 across which a partition 60 extends and divides the space between the diaphragms 58 into two chambers containing a fluid. Communication between these chambers is provided through a small orifice 61. The ring member 59 is secured to the adjacent end of thrust bar 40 so that the diaphragms 58 and ring 59 may move with the bar. The damping device includes also stationary buttons or bearing members 62 that are held against the diaphragms by means of screws 63 threaded into support plates 64 secured to clamp ring 7. Thus, when the thrust bar 40 moves only the ring 59 of the damping device can move, the diaphragms being restrained against movement. Being restrained, fluid will be displaced back and forth through the orifice 61 and damp out vibrations in the thrust measuring device 1.

When the device is set up to measure the thrust or torque of a dynamometer or the thrust of a jet engine, it may be mounted on pedestals 65 secured to a base 66 and the force to be measured applied either to the underside of bar 40 as, for example, at the point indicated by arrow 67 or by means of a clevis, the bar may be connected to the force producing member from above the bar 40.

The distance from the point at which the applied force to be measured acts on the bar 40 from the fulcrum strip 45 is indicated by L-1. If, for example, we assume that the effective area of diaphragm 2 is one square foot and the pressure applied to it is one pound per square inch, the force of the pressure acting on the diaphragm would be 144 pounds. If lever arm L-2 is four inches, then the turning moment of the force acting on the diaphragm would be equal to 144, divided by 3, or 48 foot pounds. Therefore, if lever L-1 is one foot in length, a force of 48 pounds would balance the force acting on the diaphragm.

If the effective area of the diaphragm is exactly one square foot according to the above assumption, the gauge will read directly the value of the force applied at the point 67 to bar 40 and when this force is diminished in value to zero, the needle on the gauge would read zero. However, as stated at the outset, it is difficult to make diaphragms so that they will have a precise effective area. For example, if a diaphragm having an effective area of one square foot is desired, the area of the diaphragm actually produced might be 144½ square inches or it might be 143½, in which case the gauge would not read the exact value of the force applied. Therefore, in order to cause the gauge to read the exact value of force applied, it is necessary to make an adjustment in the fulcrum. Therefore, by loosening bolts 54 and the nut on bolt 49 and adjusting blocks 48 and 52 towards or away from the center of diaphragm 2, the lengths of the lever arms L-1 and L-2 will be changed sufficiently to cause the gauge to read the exact value of the force applied to the thrust bar 40.

It will be apparent from the above description of the thrust measuring device that it is a neutral positioning device. In other words, the valve exhaust and inlet ports will both be closed whenever the force applied to bar 40 is balanced by the pressure applied to the diaphragm. Whenever these forces are out of balance, either the exhaust port will be opened to decrease the pressure on the diaphragm until the force exerted by it balances the force applied to it, or the inlet port will open to effect an increase in pressure on the diaphragm until the force exerted by it is balanced by the applied force.

Having thus described the invention, it will be apparent to those skilled in this art that various modifications and changes may be made in the structure embodying the principles of the invention without departing from either the spirit or the scope thereof. Therefore, what I claim as new and desire to secure by Letters Patent is:

I claim:

A force measuring device comprising a housing provided with a diaphragm and means for clamping the marginal edge thereof to said housing to form a pressure-tight chamber between the free portion of the diaphragm and said housing, the middle portion of said diaphragm having a rigid bearing member to which a force to be measured may be applied, a valve actuated by said diaphragm having neutral, exhaust and pressure admitting positions for controlling the value of pressure established in said chamber, said valve admitting fluid pressure when in the admitting position, exhausting pressure therefrom in the exhaust position and maintaining pressure therein when in neutral position, said valve being actuated to said positions according to whether the force to be measured is equal to, less, or greater than the force exerted by said pressure on said diaphragm, a thrust bar having one end disposed to act on said bearing member, and a fulcrum comprising a rigid member secured to the diaphragm housing and being adjustable in a direction lengthwise of the thrust bar, a rigid member secured to said bar and being adjustable lengthwise of said bar, and a flexible tension member secured to said rigid members.

ALFRED A. MARKSON.

REFERENCES CITED

The following references are of record in the file of this patent:

UNITED STATES PATENTS

| Number | Name | Date |
|---|---|---|
| 1,680,750 | Smoot | Aug. 14, 1928 |
| 1,711,066 | Smoot | Apr. 30, 1929 |
| 2,013,810 | Shimek | Sept. 10, 1935 |
| 2,016,824 | Smith | Oct. 8, 1935 |
| 2,073,838 | Hammond | Mar. 16, 1937 |
| 2,248,322 | Annin | July 8, 1941 |
| 2,431,200 | Rosenberger | Nov. 18, 1947 |
| 2,446,385 | Newell | Aug. 3, 1948 |
| 2,493,012 | Moore | Jan. 3, 1950 |

FOREIGN PATENTS

| Number | Country | Date |
|---|---|---|
| 562,645 | Great Britain | July 11, 1944 |